April 18, 1967 W. R. SMITH 3,315,239

MULTIAPERTURE CORE INCREMENTAL PULSE COUNTER

Filed May 24, 1963 2 Sheets-Sheet 1

SET AND PRIMED

CLEAR

INVENTOR.
W.R. SMITH
BY
Forest B. Hitchcock
HIS ATTORNEY

INVENTOR.
W.R. SMITH
BY
*Forest B. Hitchcock*
HIS ATTORNEY 3,315,239
MULTIAPERTURE CORE INCREMENTAL PULSE COUNTER
Willis R. Smith, Rochester, N.Y., assignor to General Signal Corporation, Rochester, N.Y., a corporation of New York
Filed May 24, 1963, Ser. No. 283,080
6 Claims. (Cl. 340—174)

This invention relates to incremental counters, and more particularly to an incremental counter utilizing a multiaperture ferrite core for providing an indication of a predetermined number of counts.

Development of square loop hysteresis material has recently made available magnetic components which are highly adaptable to use in incremental counters. This is because magnetic cores composed of such ferrite material have the property of retaining specific magnetic flux levels in response to discrete changes in magnetomotive force, even after the applied magnetomotive force is removed.

Heretofore, incremental counters utilizing ferrite cores have required inclusion of many active circuit elements to enable practical and satisfactory operation. Generally speaking, these prior counters have required use of amplification devices in combination therewith, such as transistor amplifiers. It is well known that addition of circuit elements increases the possibility of circuit failure, since each added element presents an additional unit which may fail. It is especially desirable to avoid use of active elements whenever possible, since burn-out of active elements is not uncommon and can be highly detrimental to a circuit.

Therefore, one object of the invention is to provide a stable, rugged incremental counter utilizing a minimal number of active elements in the measuring circuit.

Another object is to provide a reliable counter for producing an accurate indication of a predetermined number of input counts.

Another object is to provide an incremental counter utilizing an apertured ferrite core wherein counting is begun with a portion of the core magnetically saturated in a first flux direction and indication of a total number of counts is provided when the portion of the core reaches full magnetic saturation in the opposite flux direction.

Another object is to provide an incremental counter utilizing standard, readily available circuit elements of ordinary precision.

The invention generally contemplates means for counting a predetermined number of pulses comprising a multiaperture magnetic core, means coupled to the core for setting the core, winding means threading the major aperture of the core, unidirectional conducting means connected across the winding means, means coupling the pulses through the major aperture of the core and means coupling an output signal from the core upon full clearing thereof.

The foregoing and other objects and advantages of the invention will become apparent from the following detailed description when read in conjunction with the accompanying drawings in which.

Figure 1:
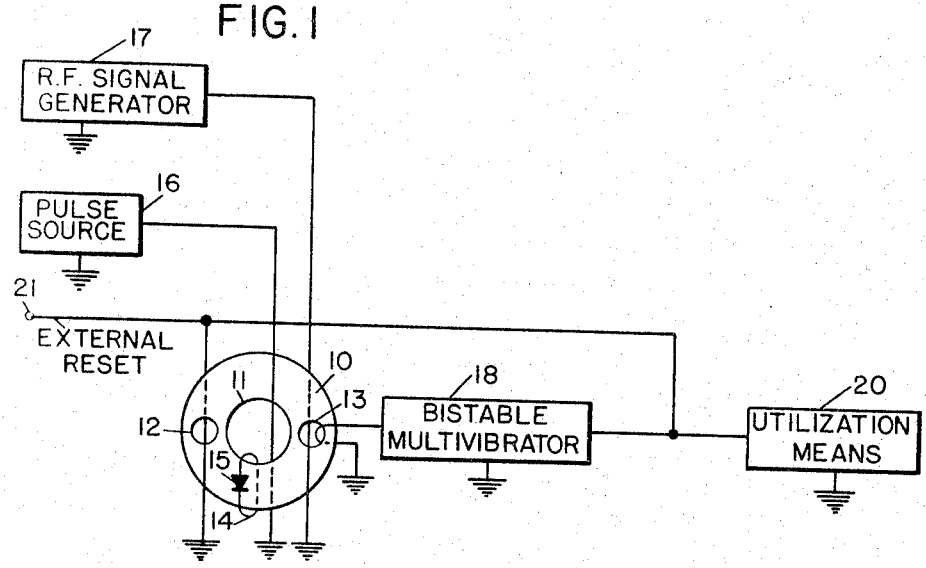
FIG. 1 is a schematic diagram of a first embodiment of the invention.

Referring now to FIG. 1, there is shown a multiaperture ferrite core 10 having a major aperture 11 and a pair of minor apertures 12 and 13. A winding 14 is coupled through the major aperture having a diode rectifier 15 connected in shunt across the winding. Thus, a short circuit is provided across the winding when voltage induced therein is of polarity to cause forward current to flow through the diode, while a substantially open circuit exists across the winding when voltage is induced in the winding with polarity in opposition to the diode polarization.

A pulse source 16 for providing clear pulses through the major aperture of the core is also provided. This pulse source may comprise a transducer responsive to a condition which is desired to be counted. In addition, a source of radio frequency current 17 is provided for alternately priming and non-destructively driving minor aperture 13 of core 10 to ensure production of output current from the core.

The core is reset through its minor aperture 12 when a pulse is produced from a bistable multivibrator 18. Output from the multivibrator is coupled back through minor aperture 12 of core 10. The multivibrator output is responsive to cessation of output current from core 10 through output minor aperture 13 when the core is fully cleared. Moreover, the multivibrator is biased to an "off" condition when the core is in its set (or reset) condition; when the core is cleared, the multivibrator is turned "on."

Utilization means 20 are also coupled to the output of multivibrator 18. The utilization means may comprise a successive counting stage wherein output from the multivibrator is coupled to and actuates a pulse source similar to pulse source 16. Alternatively, the utilization means itself may act as such pulse source for a successive stage. On the other hand, the utilization means may comprise a form of indicator, or some other circuit capable of utilizing counts from the counter.

An external reset terminal 21 is also provided. This terminal is connected to a conductor threading the core through minor aperture 12, enabling energization of the conductor at times other than when multivibrator 18 produces on output. Thus, whenever it is desired to cancel the count stored in the core and reset the core preparatory to starting a new count, external reset terminal 21 is energized.

Figure 3A:
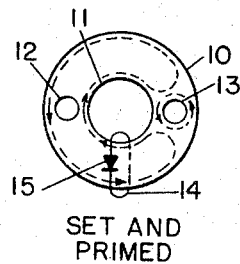
FIG. 3A is a diagrammatic illustration of magnetic flux paths through a multiaperture core in the set and primed condition.
Figure 3B:
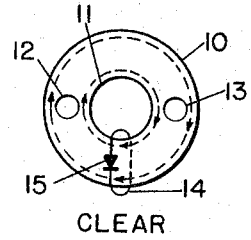
FIG. 3B is a diagrammatic illustration of magnetic flux paths through a multiaperture core in the clear condition.

In operation, assume the core is in a set state. Since prime current is alternately coupled through output minor aperture 13 from source 17, flux paths are established in core 10 having directions illustrated by arrows shown in FIG. 3A. Complete flux paths are illustrated by dotted lines in the figure. Thus, from FIG. 3A it is readily apparent that when the core is fully set and output minor aperture 13 is primed, substantially no net flux exists in the body of the core encircled by winding 14. This is because the fluxes in this portion of the core are oriented in opposite directions. Moreover, alternate clockwise and counterclockwise flux path exists around minor aperture 13, depending upon the instantaneous polarity of radio frequency current. It should be pointed out that the flux paths shown in FIGS. 3A and 3B are purely hypothetical; however, they are indicated in the drawings simply as an aid to understanding operation of the counter.

If pulse source 16 of FIG. 1 now begins producing pulses in response to items to be counted, a clear pulse is coupled through the major aperture of the core each time an item is counted. Each time a clear pulse is passed through major aperture of the core, the core tends to switch to a clear state. However, before the core has sufficient time to switch more than a small amount towards its clear state, the clear pulse induces a voltage in winding 14 by transformer action, so as to produce a forward-directed current through diode 15. Transformer action occurs because the portion of the core encircled by winding 14 is unsaturated, due to opposing flux directions in the core material encircled by the winding as previously described.

The direction of induced current flow in winding 14 is such as to oppose the direction of current flow produced from pulse source 16. However, it is well known that induced current lags its primary current. Therefore, before the pulse produced from source 16 can fully clear the core, the induced current in winding 14 arises. The net effect is that the core is only partially cleared. Similarly, production of a subsequent pulse from pulse source 16 serves to partially clear core 10 still further. Thus each time a pulse is produced from source 16, the core is cleared a bit further. It should also be noted that the number of turns in winding 14 has a direct bearing upon the amount of the change in flux density which occurs in the portion of the core encircled by winding 14 each time a clear pulse is produced.

Partial clearing of the core continues to produce output pulses from output minor aperture 13 of the core. Full clearing of the core is required in order to halt production of output pulses from minor aperture 13 as is well known.

Figure 4:
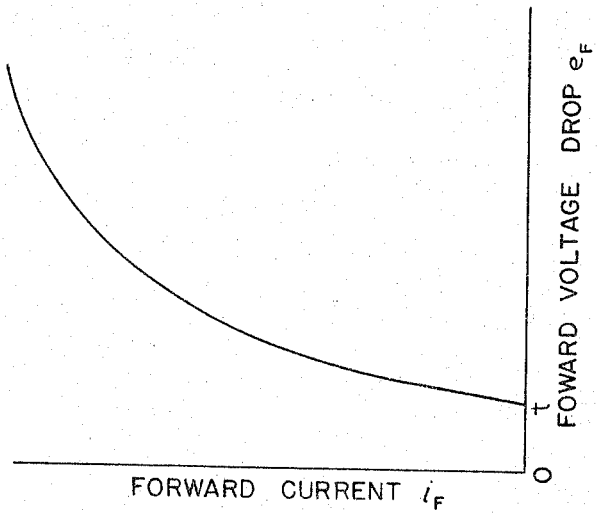
FIG. 4 is a typical diode characteristic curve used to aid in the explanation of operation of the embodiments of FIGS. 1 and 2.

When the portion of the core encircled by winding 14 reaches magnetic saturation, a pulse produced from source 16 does not provide sufficient energy to induce a sufficiently high voltage in winding 14 to cause current to flow through diode 15 in the forward direction. This is because the voltage induced across the diode is too low to cause operation on the low resistance portion of the diode characteristic, which is illustrated in FIG. 4. Thus, as shown in FIG. 4, if the forward voltage $e_F$ across diode 15 falls below a threshold value $t$, no forward current $i_F$ flows through the diode. Thus, no induced current flows through the major aperture in opposition to the clear pulses produced by pulse source 16. This causes the core to fully clear, thereby inducing fluxes through the core as indicated in FIG. 3B. It is now obvious that in the clear condition the portion of the core encircled by winding 14 is saturated, since flux directions in this portion of the core all have identical orientation. The core is then reset by feedback of a portion of the output from multivibrator 18 through input minor aperture 12.

Figure 2:
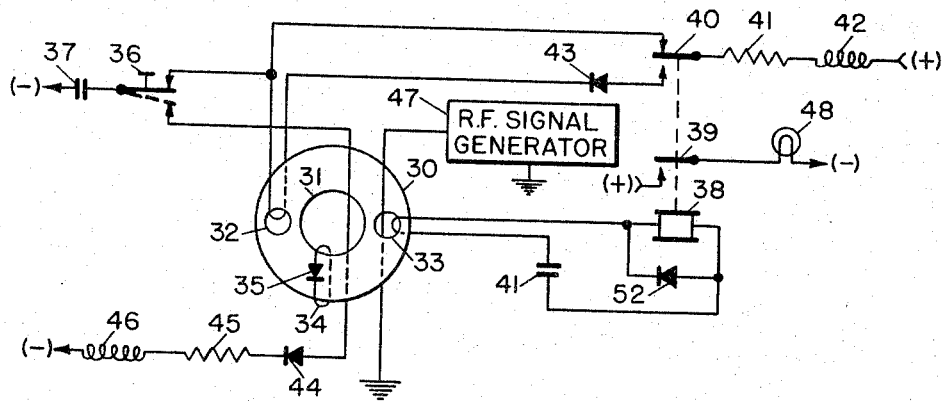
FIG. 2 is a schematic diagram of a second embodiment of the invention.

Turning next to FIG. 2, there is shown a second embodiment of the invention requiring still less active circuit elements than the embodiment of FIG. 1. In FIG. 2 a multiaperture ferrite core 30 is shown having a major aperture 31 and a pair of minor apertures 32 and 33. A winding 34 is coupled through the major aperture with a diode rectifier 35 shunted across the winding output. A switch 36, which may be operated by movement of the device to be monitored by the counter, is provided in the circuit with the heel of its contact coupled to a capacitor 37. A relay 38 having a back contact 39 and a front and back contact 40 is coupled to the output minor aperture 33 of core 30, in series with a capacitor 41. A diode 52 is shunted across the coil of relay 38. The heel of contact 40 is coupled to a source of positive direct current through a series-connected resistor 41 and inductor 42. Front contact 40 is coupled to the front contact of switch 36. Back contact 40 is coupled through minor aperture 32 of core 30 through a diode 43 to the front contact of switch 36, in order to set the core. The back contact of switch 36 is coupled through major aperture 31 of core 30 through a series circuit comprising a diode 44, resistor 45 and inductor 46 to the negative side of the direct current source, so that closing of back contact 36 discharges charged capacitor 37 through the major aperture of the core, clearing the core. Resistor 45 and inductor 46 serve to lengthen the pulse provided by discharge of capacitor 37 and to provide steep front sides for the pulse produced therefrom, respectively. Diode 44 eliminates the possibility of reverse transient currents passing through the major aperture when the capacitor is discharged.

A radio frequency signal generator 47 couples a radio frequency signal through output minor aperture 33, enabling energization of relay 38 when the core is set. This is because the radio frequency signal provides flux switching at a radio frequency rate around the output minor aperture as long as the core is set.

The combination of capacitor 41 and diode 52 serves to increase energization voltage applied across relay 38. Thus, on one half cycle of the output radio frequency signal produced from minor aperture 33, current flows through capacitor 41 and through diode 52 in the forward direction, causing the plate of capacitor 41 on the right side to acquire a negative charge. On the next successive half cycle, positive voltage is applied to the left side of relay 38, while the additional negative charge present on the right plate of capacitor 41 serves to increase the voltage applied across relay 38. Thus, energization of relay 38 throughout the entire interval in which core 30 is set, is assured. It should be noted that the heel of contact 39 of relay 38 may be coupled to indicator means 48, such as a lamp, for example. However, instead of an indicator, contact 39 can be coupled to a subsequent counter stage if so desired.

In operation, assume core 30 is set. Under these circumstances, relay 38 is energized, so that back contact 39 is open and front contact 40 is closed. This permits capacitor 37 to acquire a charge through resistor 41 and inductor 42.

Now assume the back contact of switch 36 is momentarily closed each time it is desired to register a count. Closing of back contact 36 causes discharge of capacitor 37 through the major aperture of core 30. As previously explained, each clear pulse passed through the major aperture of the core drives the body of the core encircled by winding 34 closer to saturation. While the core body is unsaturated, each clear pulse induces a current through winding 34 and diode 35 in the forward direction, thereby causing a current to flow through the major aperture in a direction opposing the clear current pulses through the major aperture. However, this opposing current does not arise quickly enough to fully oppose the clear pulse inducing the current. Thus, the portion of the core encircled by winding 34 approaches saturation in small, substantially equal increments, with a single increment occurring each time back contact 36 is closed.

When the portion of the core encircled by winding 34 becomes magnetically saturated, the clear current passed through the major aperture is substantially unopposed by reverse current flow through winding 34. The entire core is thereby cleared by the substantially unopposed clear pulse. This causes relay 38 to deenergize, closing back contacts 39 and 40. Closing of back contact 39 produces an indication on indicator means 48, while closing of back contact 40 resets the core through input minor aperture 32 when the front contact of switch 36 is closed. This occurs because capacitor 37 now charges through a circuit comprising inductor 42, resistor 41, back contact 40 of relay 38 and diode 43. The functions of inductor 42, resistor 41 and diode 43 are identical to the respective functions described for inductor 46, resistor 45 and diode 44. When the core is reset, relay 38 again energizes and the counter is prepared to resume counting.

As previously mentioned, a subsequent counter stage can be coupled to back contact 39 of relay 38. This back contact can provide the clear current for a subsequent core. Thus, each time relay 38 deenergizes, indicating that core 30 has counted to its maximum count, the subsequent core receives a clear pulse. This can be accomplished in a circuit identical to that shown in FIG. 2 with the exception that back contact 39 be used for discharging a charged capacitor corresponding to capacitor 37 of the preceding stage, through the major aperture of the subsequent core. This, when relay 38 deenergizes, indicating that core 30 has counted to its maximum count, a single count is provided to the subsequent core. In this fashion, a counter for counting units, tens, hundreds, thousands, etc. can be built using the basic counter circuit of FIG. 2.

Figure 5:
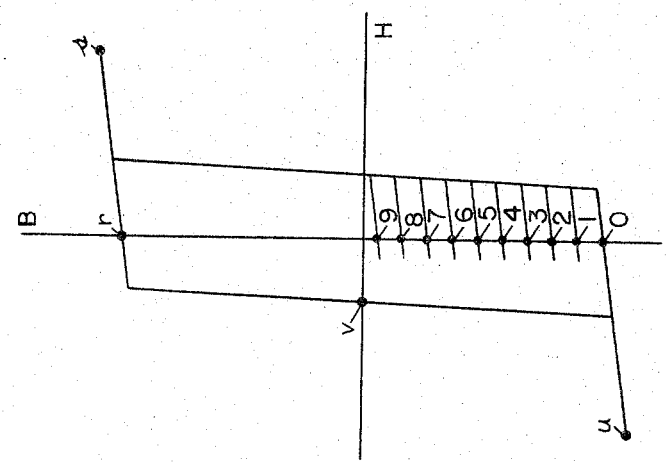
FIG. 5 is a hysteresis loop for the ferrite core used in the embodiment of FIGS. 1 and 2.

Turning now to FIG. 5, there is shown a magnetic hysteresis loop for the core leg on the outside of minor aperture 13 of FIG. 1 or the leg on the outside of minor aperture 33 of FIG. 2. The substantially rectangular shape of the major and minor hysteresis loops is attributable to the ferrite material of which the core is composed. The loops, plotted as standard B vs. H curves wherein B is a measure of flux density and H is a measure of magnetomotive force, are somewhat idealized for ease of explanation. The hysteresis loops will be described in conjunction with core 10 of FIGS. 1, 3A and 3B; however, it is obvious that a similar explanation holds true for core 30 of FIG. 2.

Counting is begun with the core in a fully set condition. This condition requires that the core leg on the outside of minor aperture 13 be in a fully saturated condition, as represented in FIG. 5 by the digit 0 which arbitrarily indicates negative saturation.

Assume now that operation is to occur for positive changes in flux density B. This means that as the portion of the core outside minor aperture 13 approaches full magnetic unsaturation, the operating point will move upward along the right side of the major hysteresis loop.

When the first count is applied to core 10, the core is cleared to a small extent, causing the portion of the core outside minor aperture 13 to approach positive saturation by a small amount. When the clear current dies away, some opposing current continues to flow for a brief interval in winding 14. This causes a momentary reversal of polarity of magnetomotive force H. Thus, in altering remanent flux density from point 0 to point 1, there is a momentary swing to the left of point 1. When the opposing current dies out, the net current through the major aperture of the core becomes zero. The flux density of the core material on the outside of minor aperture 13 then returns to a remanent condition, indicated by the location of point 1 on the zero magnetomotive force axis Thus, the remanent magnetic condition of core material outside minor aperture 13 has been decreased from a value of flux density indicated by point 0 to a value indicated by point 1.

Similarly, upon passage of the next clear pulse through the major aperture, the flux density of the core leg outside minor aperture 13 moves from point 1 in the positive magnetomotive force direction to the vertical side of the major hysteresis loop, and travels upward along this vertical side by a small increment. When the net current through the major aperture swings negative and then returns to zero, for reasons previously explained the portion of the core on the outside of minor aperture 13 assumes the remanent flux density state indicated by point 2 on the zero magnetomotive force axis. Similarly, each time a clear pulse is passed through the major aperture of the core, the remanent magnetic condition of the core leg outside minor aperture 13 moves upward along the zero magnetomotive force axis, decreasing in negative flux density and thereby decreasing the set condition of the core, until the tenth clear pulse is applied to the core.

When the tenth clear pulse is applied, the core is driven out of saturation, permitting a substantially unopposed clear current to flow, as previously indicated. This causes the magnetic state of the core leg outside minor aperture 13 to move upward along the major hysteresis loop to a value of flux density designated $s$. The core is thereby cleared, causing multivibrator 18 to turn "on" and produce an output.

When the clear pulse dies out, the flux density of the core leg encircled by winding 14 returns to a point designated $r$ on the zero magnetomotive force axis H. However, because the core is set immediately thereafter, the magnetic condition of the portion of core material outside minor aperture 13 is shifted by a negative magnetomotive force downward along the left side of the major hysteresis loop to the point where the core leg outside minor aperture 13 again becomes negatively saturated. This point is indicated on the B vs. H curve as $u$. When the zero flux density point, designated $v$, is crossed, the multivibrator is turned off.

When the set current dies out, the remanent magnetic state of the portion of the core outside minor aperture 13 is changed from point $u$ to the point designated 0. At this point, the core is in condition to count a new cycle.

It should be noted that although the possibility of making ten counts is indicated on the B vs. H curve of FIG. 5, the circuit is not limited to making ten counts; any number of counts which can be distinguished from each other by the circuit indication or utilization means may be used.

Thus, there has been shown an incremental counter for providing an accurate indication of a predetermined number of input counts. The device is stable, rugged, and requires a minimal number of active elements in the measuring circuit. The counter utilizes standard, readily available circuit elements of ordinary precision.

Although but several embodiments of the present invention have been described, it is to be specifically understood that these forms are selected to facilitate in disclosure of the invention rather than to limit the number of forms which it may assume; various modifications and adaptations may be applied to the specific forms shown to meet requirements of practice, without in any manner departing from the spirit or scope of the invention.

What I claim is:

1. Means for counting a predetermined number of pulses comprising a multiaperture magnetic core, means coupling a set signal to the core, winding means threading the major aperture of the core, unidirectional conducting means shunting the winding means, means coupling said pulses through the major aperture of the core to constitute clearing pulses, said winding means permitting each clearing pulse to change the magnetization of each core only incrementally to require a predetermined number of pulses to fully clear said core, means coupling an output signal from the core upon full clearing thereof, and additional means coupling an output signal from the core upon full clearing thereof to the means coupling a set signal to the core.

2. An incremental counter responsive to a predetermined number of pulses comprising a multiaperture magnetic core, means coupling a set signal to the core, unidirectionally short-circuited winding means threading the major aperture of the core, means inductively coupling said pulses to be counted to said core and to said winding means, said unidirectionally short circuited winding requiring a predetermined number of pulses to be coupled to said core for fully clearing it but permitting a single set signal to restore the core to normal, means coupling an output signal from the core upon full clearing thereof, and additional means coupling an output signal from the core upon full clearing thereof to the means coupling a set signal to the core.

3. In a circuit for counting pulses the combination comprising a multiaperture magnetic core, means coupling pulses to be counted through the major aperture of the core, winding means having a specific number of turns thereon threading the major aperture of the core, means coupling a set signal to the core upon completion of a predetermined number of counts, said number of counts dependent upon said number of turns, unidirectional conducting means connected in parallel with said winding means and means coupling an output signal from said core upon full clearing thereof.

4. Means for counting a predetermined number of electrical pulses applied to a multiaperture magnetic core comprising means coupling a set signal through a first aperture of the core, winding means threading a second aperture of said core, unidirectional conducting means connected in parallel with said winding means, means coupling said pulses to be counted through the second aperture in a direction to clear the core, said winding means allowing only incremental change in the magnetization of said core upon the occurrence of each said pulse to thereby require a predetermined number of clearing pulses to fully clear said core, means coupling an output signal from a third aperture upon full clearing of the core, and additional means coupling an output signal from the core upon full clearing thereof to the means coupling a set signal through the first aperture of the core.

5. Means for counting a predetermined number of pulses applied to a multiaperture magnetic core comprising means coupled to a first aperture of the core for setting said core, means coupling clear pulses of fixed polarity through a second aperture of said core, means magnetically coupling induced pulses opposite in polarity to said clear pulses through said second aperture in response to production of said clear pulses as long as the core remains set above a predetermined value and means coupling an output signal from said core when the set condition of said core falls below said predetermined value.

6. The means for counting a predetermined number of pulses of claim 5 having additional means coupling an output signal from the core when the set condition of said core falls below said predetermined value to the a set signal through the first aperture of the core.

References Cited by the Examiner
UNITED STATES PATENTS 2,733,424  1/1956  Chen _____ 340—174
3,197,745  7/1965  Sweeney _____ 340—174

BERNARD KONICK, *Primary Examiner.*

S. M. URYNOWICZ, *Assistant Examiner.*